Jan. 27, 1925.

H. V. TENNANT ET AL 1,524,061

CHRISTMAS TREE HOLDER

Filed April 2, 1923

WITNESSES

INVENTOR
Herschel V. Tennant
David Bogue
By R. S. Caldwell
ATTORNEY

Patented Jan. 27, 1925.

1,524,061

UNITED STATES PATENT OFFICE.

HERSCHEL V. TENNANT AND DAVID BOGUE, OF PORTAGE, WISCONSIN.

CHRISTMAS-TREE HOLDER.

Application filed April 2, 1923. Serial No. 629,345.

*To all whom it may concern:*

Be it known that we, HERSCHEL V. TENNANT and DAVID BOGUE, both citizens of the United States, and residents of Portage, in the county of Columbia and State of Wisconsin, have invented new and useful Improvements in Christmas-Tree Holders, of which the following is a description, reference being had to the accompanying drawings, which are a part of this specification.

This invention has for its object to provide a simple, inexpensive sheet metal construction for securely clamping the stem of a Christmas tree and supporting it in an upright position, the weight of the tree tending to increase the clamping engagement.

Another object of the invention is to utilize an inverted conical centerpiece as the fulcrum for the stem-clamping legs of the holder and as a centering means for aiding in the stem supporting function and as a water container for keeping the tree fresh.

Another object of the invention is to provide such a Christmas tree holder with its parts detachable and easily arranged in a compact formation for shipment.

Another object of the invention is to provide a Christmas tree holder with stem-clamping and floor-engaging legs equipped with spurs for effecting a firm engagement with the tree stem and the floor.

With the above and other objects in view the invention consists in the Christmas tree holder as herein claimed and all equivalents.

Figure 1:
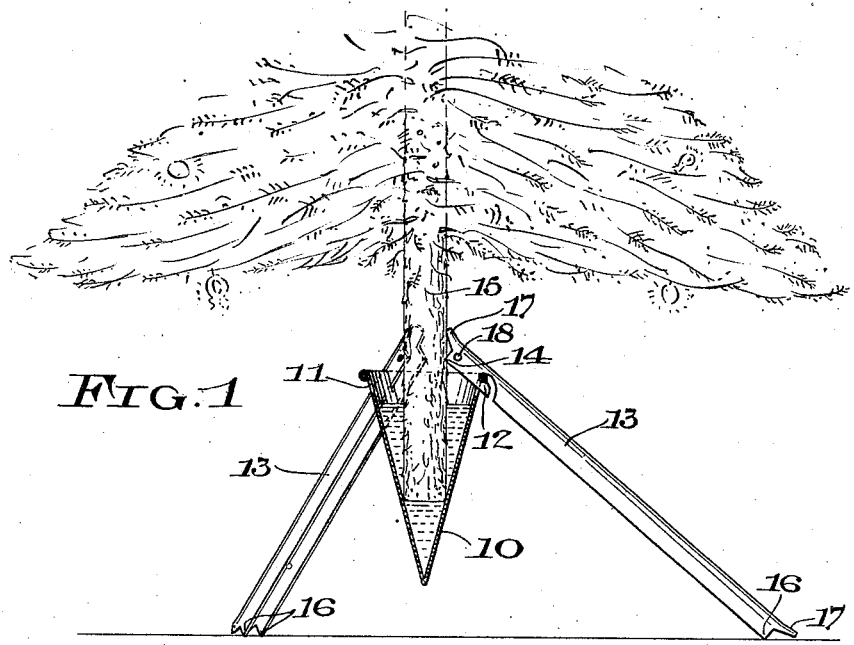
Figure 2:
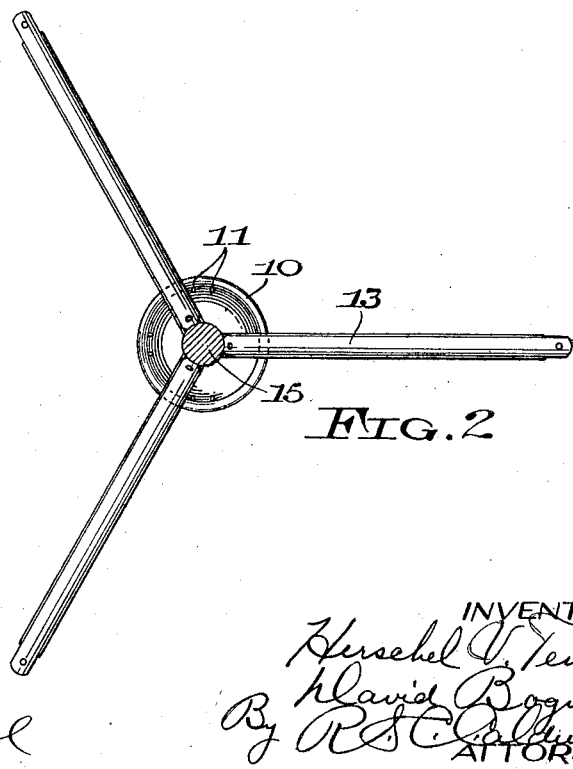

Referring to the accompanying drawings, in which like characters of reference indicate the same parts in different views, Figure 1 is a sectional elevation of a Christmas tree holder constructed in accordance with this invention with the tree in place therein;

Fig. 2 is a plan view thereof, the stem being sectioned.

In these drawings, 10 indicates a cone-shaped centerpiece provided with pairs of slots 11 near its edge to receive hook-like projections 12 formed in the edges of U-shaped sheet metal leg members 13. The hook projections 12 are formed by stamping slots in the parallel side flanges of the leg members so that the leg members may fulcrum on the rolled rim of the centerpiece, which may or not be wired.

The upper end of each leg member 13 is cut so as to form a pair of spurs 14 to cut into the stem of the Christmas tree 15 when the latter is placed within the centerpiece, as shown, the weight of the tree serving to cause the spurs to dig deeply into the stem and increase the effectiveness of the clamping engagement. The stem, being engaged within the centerpiece where its end meets the converging walls of the centerpiece and being clamped by the spurs of the leg members at some distance above its end, is thus given a secure supporting engagement that will hold it rigidly upright.

At the lower end of each leg member it is so cut as to form a pair of spurs 16 for engagement with the floor or other support. Between the spurs 14 and 16 the leg members form projecting bent extensions 17, each provided with an opening to receive a tack or small nail, if it is desired to use this further attaching means for securing the leg members to the stem or the floor or other base. Such means used with the upper ends of the leg members to attach them to the stem of the tree permits of the tree being lifted and moved from one place to another without disturbing the engagement of the Christmas tree holder therewith.

The Christmas tree holder of this invention is simply constructed of sheet metal parts which need not be assembled until they are ready for use. This permits of the centerpieces being nested together and the leg members similarly fitted together so as to occupy small space as a convenience for shipping. When it is desired to set up a Christmas tree holder it is only necessary to engage the hooks 12 of the respective leg members in the slots 11, as shown, the latter being of sufficient number and so arranged as to permit either of three or four leg members being attached thereto. With the stem of the tree engaged in the centerpiece 10, the leg members, fulcrumed by their hook engagement with the rim of the centerpiece, are permitted to swing into engagement with the tree stem, thus spreading their lower ends as far apart as possible according to the thickness of the tree stem and, when the weight of the tree is supported by the holder, the spurs 14 and 16 enter their respective engaging surfaces to rigidly and securely hold the tree upright, adapting themselves automatically to the conditions as to the size of the tree stem. The centerpiece forms a container for water, which will serve to keep the tree fresh.

The upper ends of the leg members are provided with openings 18, through which a wire may be passed so as to bind the leg members together around the tree stem and so permit of the Christmas tree holder remaining in engagement with the tree stem while the tree is lifted and moved from place to place.

It will be noted that nails, screws, bolts or other securing devices are not necessary in order to make connections with the tree at the bottom of the centerpiece and with the legs at the top of the centerpiece. At the latter point the hook engagement with the rim of the cone is sufficient, while the wedging of the end of the tree stem into the conical centerpiece assures a firm connection at the lower end of the tree stem.

The purpose of making the centerpiece in the form of a cone-shaped cup is to assure that, no matter what the size of the stem of the tree, the connection with the base will be made in the same manner, the engagement being made farther up or lower down in the cone according to whether the tree stem is large or small.

What we claim as new and desire to secure by Letters Patent is:

1. A Christmas tree holder comprising a conical cup-shaped centerpiece having slots in its rim, U-shaped sheet metal leg members having slots in their side flanges forming downwardly extending hooks for detachably engaging the slots of the centerpiece to fulcrum the leg members on the centerpiece with their shorter upper ends adapted to engage the stem of a Christmas tree seated in the centerpiece while their lower ends bear on the floor or other support.

2. A Christmas tree holder comprising a conical cup-shaped centerpiece having slots in its rim, leg members of sheet metal U-shaped in cross-section having hooks formed in their side flanges adapted to detachably engage the slots of the centerpiece, spurs on the upper and lower ends of the leg members for engaging the stem of a Christmas tree and the floor or other support respectively, projections on the leg members between the spurs having openings to receive a tack or other attaching means for attaching said ends of the leg members to the stem of the Christmas tree and to the floor or other support.

3. A Christmas tree holder comprising a conical cup-shaped centerpiece having slots in its rim, sheet metal leg members U-shaped in cross-section having hooks for engaging the slots of the centerpiece, and openings at the upper ends of the leg members through which a tie-wire may be passed for binding the ends of the leg members around the tree stem.

In testimony whereof, we affix our signatures.

HERSCHEL V. TENNANT.
DAVID BOGUE.